(12) United States Patent
Inaba et al.

(10) Patent No.: US 10,478,965 B2
(45) Date of Patent: Nov. 19, 2019

(54) ROBOT SYSTEM

(71) Applicant: Fanuc Corporation, Yamanashi (JP)

(72) Inventors: Gou Inaba, Yamanashi (JP); Tomoyuki Yamamoto, Yamanashi (JP); Hiromitsu Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 126 days.

(21) Appl. No.: 15/910,492

(22) Filed: Mar. 2, 2018

(65) Prior Publication Data

US 2018/0281172 A1   Oct. 4, 2018

(30) Foreign Application Priority Data

Mar. 31, 2017   (JP) .................................. 2017-071702

(51) Int. Cl.
*B25J 9/00* (2006.01)
*B25J 9/16* (2006.01)
(Continued)

(52) U.S. Cl.
CPC .............. *B25J 9/0081* (2013.01); *B25J 9/161* (2013.01); *B25J 9/1664* (2013.01); *B25J 13/06* (2013.01);
(Continued)

(58) Field of Classification Search
CPC ........ B25J 9/0081; B25J 9/161; B25J 9/1664; B25J 13/06; B25J 19/06; B25J 9/1674;
(Continued)

(56) References Cited

U.S. PATENT DOCUMENTS

| | | |
|---|---|---|
| 5,783,922 A | 7/1998 | Hashimoto et al. |
| 6,218,802 B1 | 4/2001 | Onoue et al. |
| | (Continued) | |

FOREIGN PATENT DOCUMENTS

| | | |
|---|---|---|
| EP | 1582955 A2 | 10/2005 |
| JP | S61-039386 U | 3/1986 |
| | (Continued) | |

OTHER PUBLICATIONS

Japan Patent Office, Decision to Grant a Patent dated Mar. 12, 2019 for Japan Patent Application No. 2017-071702.

(Continued)

*Primary Examiner* — Bao Long T Nguyen
(74) *Attorney, Agent, or Firm* — Winstead PC

(57) ABSTRACT

Provided is a robot system including a robot; a control device configured to control the robot; a portable teach pendant connected to the control device; and a teaching handle attached to the robot and connected to the control device, where the teach pendant is provided with a first enable switch configured to permit operation of the robot by the teach pendant, the teaching handle is provided with a second enable switch configured to permit operation of the robot by the teaching handle, and the control device enables operation of the robot by the teaching handle only when the first enable switch is in an off state and the second enable switch is switched to the on state, and enables operation of the robot by the teach pendant only when the second enable switch is in an off state and the first enable switch is switched to the on state.

3 Claims, 5 Drawing Sheets

(51) Int. Cl.
  *B25J 13/06* (2006.01)
  *B25J 19/06* (2006.01)
  *G05B 19/423* (2006.01)

(52) U.S. Cl.
  CPC ............ *B25J 19/06* (2013.01); *G05B 19/423* (2013.01); *G05B 2219/36453* (2013.01); *G05B 2219/36474* (2013.01); *Y10S 901/04* (2013.01)

(58) Field of Classification Search
  CPC ........ G05B 19/423; G05B 2219/36453; G05B 2219/36474; G05B 19/406; Y10S 901/04; Y10S 901/46
  USPC ................................ 700/264, 258; 901/4, 46
  See application file for complete search history.

(56) References Cited

U.S. PATENT DOCUMENTS

| | | |
|---|---|---|
| 2005/0209734 A1 | 9/2005 | Tanaka et al. |
| 2005/0222714 A1 | 10/2005 | Nihei et al. |
| 2006/0178775 A1 | 8/2006 | Zhang et al. |
| 2006/0192515 A1 | 8/2006 | Takayama et al. |

FOREIGN PATENT DOCUMENTS

| | | |
|---|---|---|
| JP | H03-256692 A | 11/1991 |
| JP | H05-019841 A | 1/1993 |
| JP | H06-008168 A | 1/1994 |
| JP | H07-136977 A | 5/1995 |
| JP | H08-019975 A | 1/1996 |
| JP | H09-062334 A | 3/1997 |
| JP | H10-315172 A | 12/1998 |
| JP | H11-000884 A | 1/1999 |
| JP | 2003-311665 A | 11/2003 |
| JP | 2004-306159 A | 11/2004 |
| JP | 2005-219196 A | 8/2005 |
| JP | 2005-293098 A | 10/2005 |
| JP | 2006-82185 A | 3/2006 |
| JP | 2012-157946 A | 8/2012 |
| JP | 2014-193517 A | 10/2014 |

OTHER PUBLICATIONS

Japan Patent Office, Office Action dated Nov. 27, 2018 for Japan Patent Application No. 2017-071702.
Japan Patent Office, Search Report dated Nov. 16, 2018 for Japan Patent Application No. 2017-071702.

US 10,478,965 B2

ROBOT SYSTEM

CROSS-REFERENCE TO RELATED APPLICATIONS

This application claims the benefit of Japanese Patent Application No. 2017-071702, the content of which is incorporated herein by reference.

TECHNICAL FIELD

The present invention relates to a robot system.

BACKGROUND ART

Conventionally, there is known a robot system which allows so-called lead-through teaching, which is a teaching task that is performed by a user grasping a teaching handle that is attached at a tip of a wrist of a robot and moving the robot by a force applied to the teaching handle (for example, see PTL 1).

With this robot system, a deadman switch is provided on the teaching handle, and a changeover switch for switching between activation and inactivation of lead-through teaching that uses the teaching handle is provided at a control device of the robot, and in a state where the changeover switch is switched to active, if the deadman switch is pressed, lead-through teaching is enabled, and if the deadman switch is not pressed, supply of electrical power to the robot is shut off.

CITATION LIST

Patent Literature

{PTL 1}
Japanese Unexamined Patent Application, Publication No. Hei 9-62334

SUMMARY OF INVENTION

An aspect of the present invention provides robot system including a robot, a control device configured to control the robot according to an operation program, a portable teach pendant configured to be connected to the control device, and to perform a teaching operation regarding the operation program, and a teaching handle configured to be attached to the robot, to be connected to the control device, and to perform lead-through teaching, where the teach pendant is provided with a first enable switch configured to be switched to an on state in a state where the teach pendant is gripped, and to permit operation of the robot by manual operation of the teach pendant, the teaching handle is provided with a second enable switch configured to be switched to an on state in a state where the teaching handle is gripped, and to permit operation of the robot by the teaching handle, and the control device enables operation of the robot by the teaching handle only when the first enable switch is in an off state and the second enable switch is switched to the on state, and enables operation of the robot by the teach pendant only when the second enable switch is in an off state and the first enable switch is switched to the on state.

Moreover, another aspect of the present invention provides a robot system including a robot, a control device configured to control the robot according to an operation program, a portable teach pendant configured to be connected to the control device, and to perform a teaching operation regarding the operation program, and a teaching handle configured to be attached to the robot, to be connected to the control device, and to perform lead-through teaching, where the teach pendant is provided with a first enable switch configured to be switched to an on state in a state where the teach pendant is gripped, and to permit operation of the robot by manual operation of the teach pendant, the teaching handle is provided with a second enable switch configured to be switched to an on state in a state where the teaching handle is gripped, and to permit operation of the robot by the teaching handle, the teach pendant is detachably provided at the control device, and the control device includes a sensor configured to detect an attachment state of the teach pendant to the control device, and enables operation of the robot only by the teach pendant when the first enable switch is switched to the on state in a state where the teach pendant is determined by the sensor as attached, and enables operation of the robot only by the teaching handle when the second enable switch is switched to the on state in a state where the teach pendant is determined by the sensor as removed.

DESCRIPTION OF EMBODIMENTS

A robot system 1 according to an embodiment of the present invention will be described below with reference to the drawings.

Figure 1:
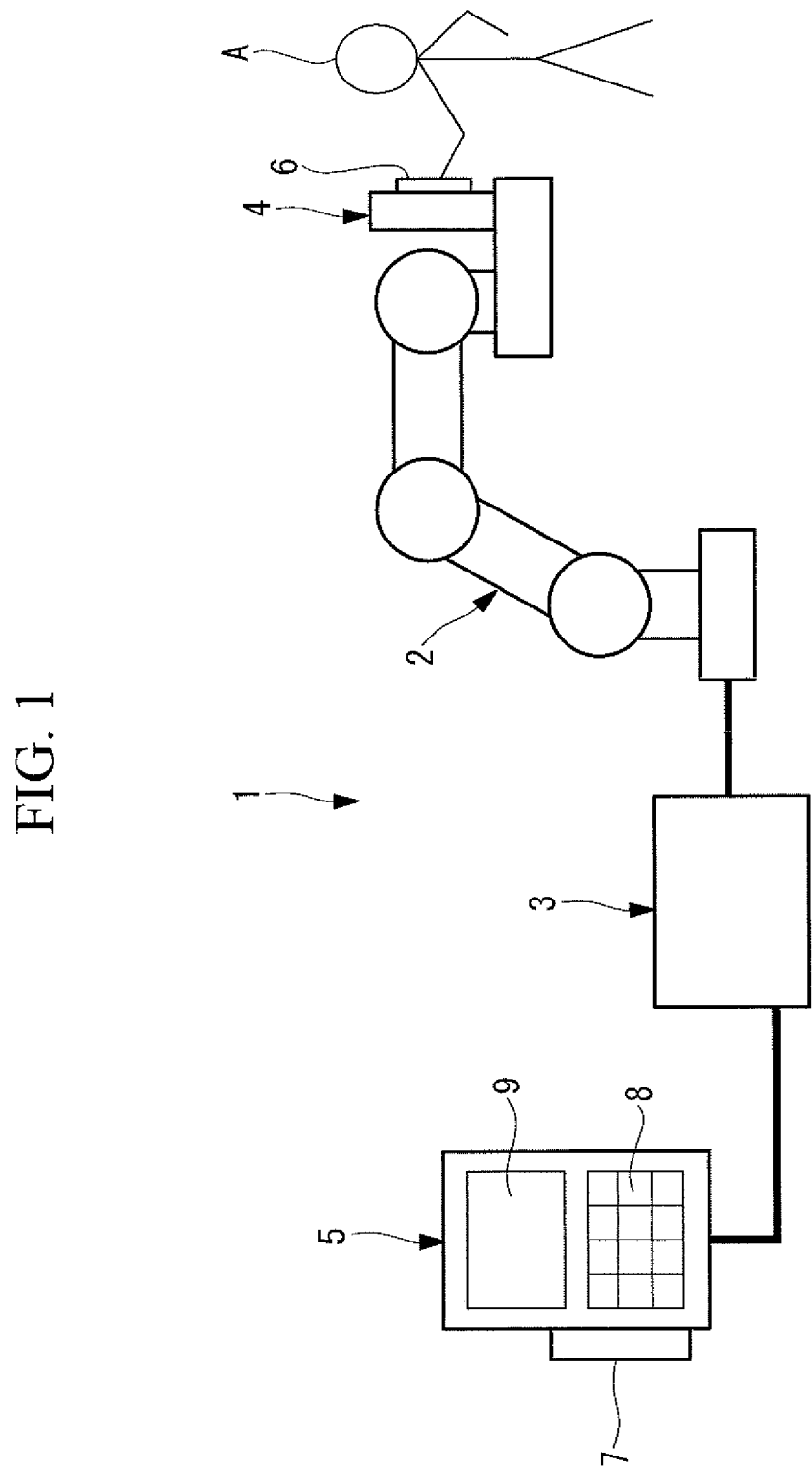
FIG. 1 is an overall configuration diagram showing a robot system according to an embodiment of the present invention.
Figure 2:
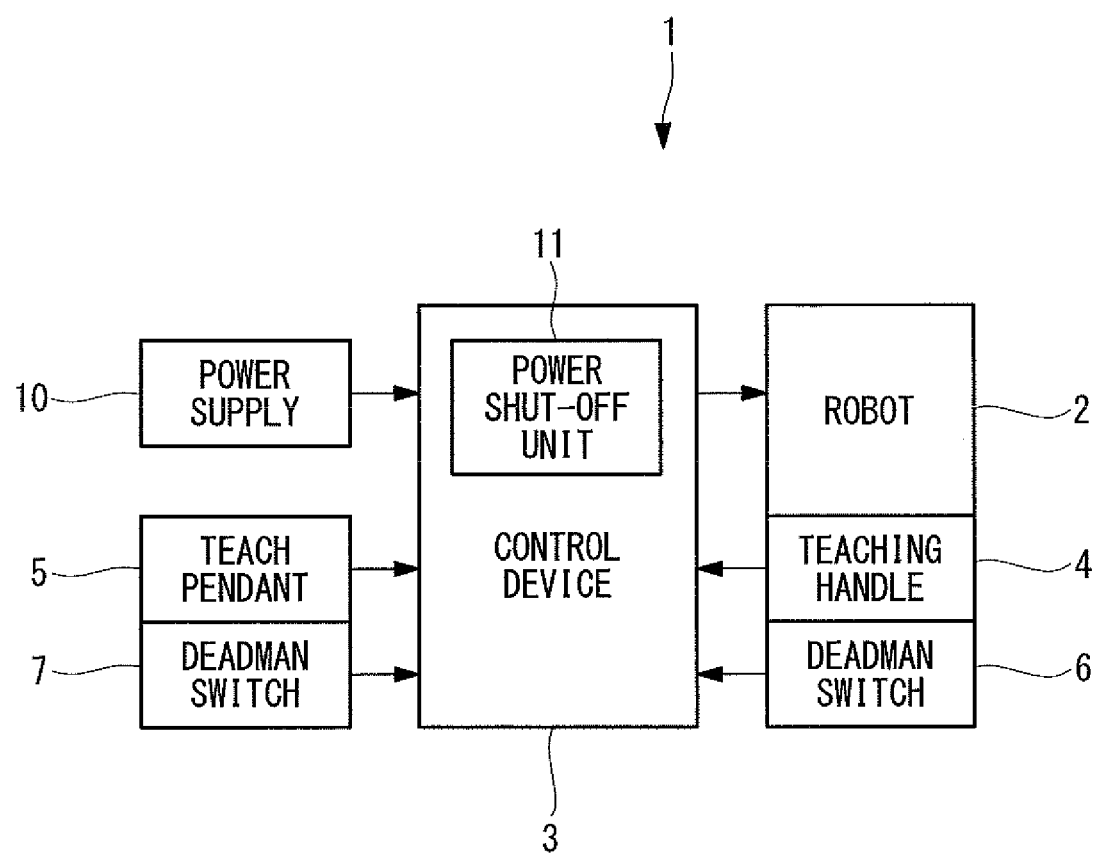
FIG. 2 is a block diagram showing the robot system in FIG. 1.

As shown in FIG. 1, the robot system 1 according to the present embodiment includes a robot 2, a control device 3 for controlling the robot 2, a teaching handle (hereinafter referred to also as "TH") 4 provided at a wrist of the robot 2, and a portable teach pendant (hereinafter referred to also as "TP") 5 connected to the control device 3. Furthermore, as shown in FIG. 2, the control device 3 includes a power supply 10 for supplying power (electrical power) to the robot 2, and a power shut-off unit 11 capable of shutting off supply of power from the power supply 10 to the robot 2.

The robot 2 may be of any type, but in the example shown in FIG. 1, the robot 2 is a vertical articulated robot.

The teaching handle 4 enables movement of the robot 2 in a direction of an applied force when an operator A grasps the teaching handle 4 and applies a force, and enables so-called lead-through teaching according to which the operator A performs teaching by directly moving a tip position of the robot 2.

The teaching handle 4 includes a deadman switch (DS: second enable switch) 6 which is switched to an on state when the teaching handle 4 is gripped by the operator A. Furthermore, the teaching handle 4 includes at least one operation unit (not shown) such as a switch which, when pressed at a position to which the tip of the robot 2 has been moved by the operator A, stores the position as a teaching point.

The teach pendant 5 includes a deadman switch (DS: first enable switch) 7 which is switched to an on state when the teach pendant 5 is gripped by the operator A, a plurality of operation keys 8, and a display unit 9, such as a liquid crystal display. When the operator A operates the operation key 8 while gripping the deadman switch 7, the robot 2 may be moved, and teaching of a complex operation program, such as teaching of a position, setting of an input/output signal, setting of speed, and setting of a jump destination of a program, may be performed.

The robot system 1 according to the present embodiment includes two operation means, which are the teaching handle 4 and the teach pendant 5, and thus, operation of the robot 2 by the operation means, i.e., the teaching handle 4 or the teach pendant 5, the deadman switch 6, 7 of which is pressed first is permitted.

That is, when both the deadman switch 6 of the teaching handle 4 and the deadman switch 7 of the teach pendant 5 are in an off state, and the deadman switch 7 provided at the teach pendant 5 is switched to the on state by the teach pendant 5 being gripped by the operator A, operation of the robot 2 is permitted only to the teach pendant 5. Then, when the deadman switch 7 of the teach pendant 5 is switched to the off state during operation of the robot 2 using the teach pendant 5, power that is supplied to the robot 2 is shut off.

On the other hand, when both the deadman switch 6 of the teaching handle 4 and the deadman switch 7 of the teach pendant 5 are in the off state, and the deadman switch 6 provided at the teaching handle 4 is switched to the on state by the teaching handle 4 being gripped by the operator A, operation of the robot 2 is permitted only to the teaching handle 4. Then, when the deadman switch 6 of the teaching handle 4 is switched to the off state during operation of the robot 2 using the teaching handle 4, power that is supplied to the robot 2 is shut off.

Moreover, with the robot system 1 according to the present embodiment, the control device 3 controls the power shut-off unit 11 to shut off power that is supplied to the robot 2, at a time point of the deadman switches 6, 7 of both the teach pendant 5 and the teaching handle 4 being placed in the on state.

An operation of the robot system 1 according to the present embodiment configured in the above manner will be described below.

Figure 3:
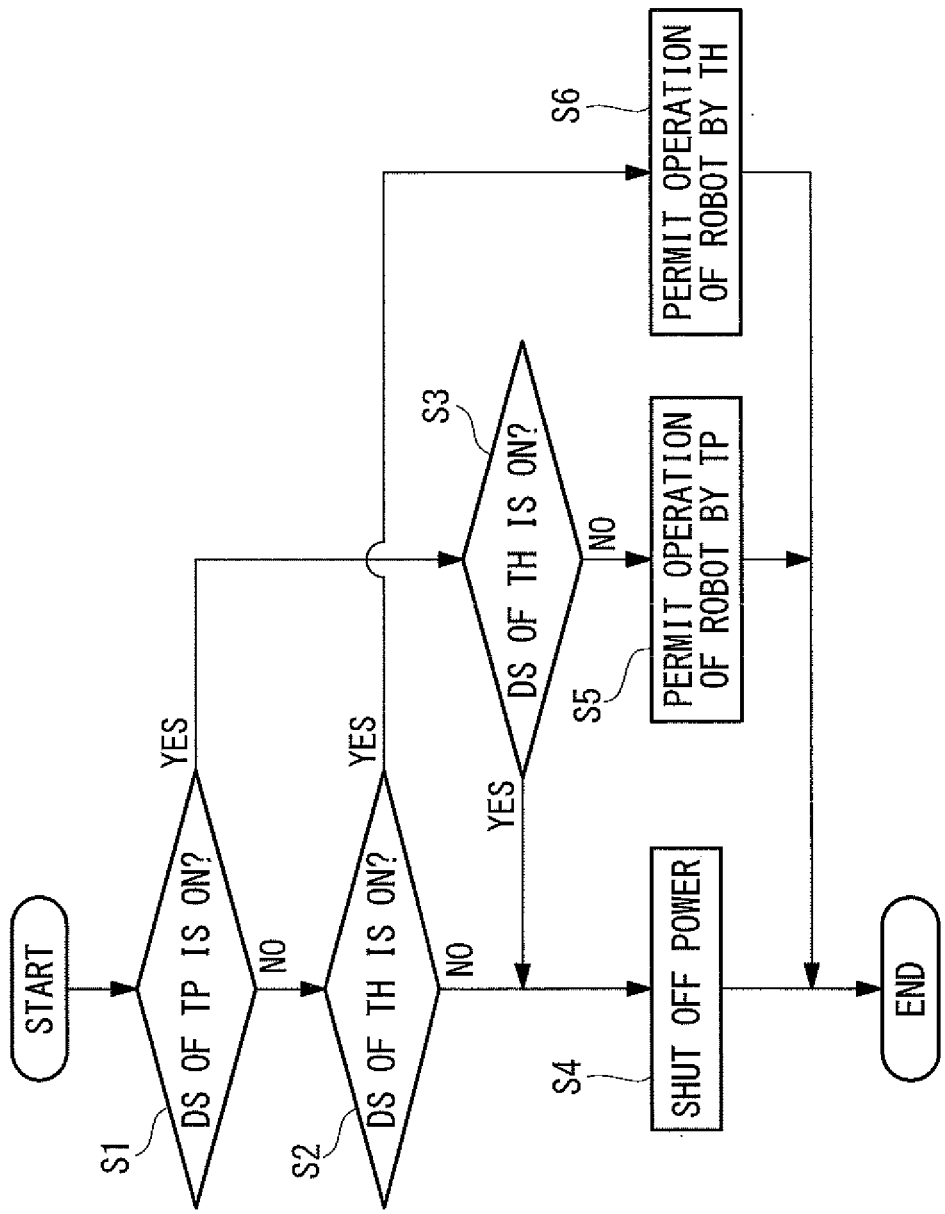
FIG. 3 is a flowchart describing an operation of the robot system in FIG. 1.

As shown in FIG. 3, to teach an operation program of the robot 2 by using the robot system 1 according to the present embodiment, the operator A selects one of the teaching handle 4 and the teach pendant 5.

In an initial state, the deadman switches 6, 7 of both the teach pendant 5 and the teaching handle 4 are in the off state, and whether or not the deadman switch 7 of the teach pendant 5 has been switched to the on state by the teach pendant 5 being gripped by the operator A is determined (step S1). In the case where the deadman switch 7 has been switched to the on state, whether or not the deadman switch 6 has been switched to the on state by the teaching handle 4 being gripped is determined (step S3). In the case where the deadman switch 6 is in the off state, operation of the robot 2 by the teach pendant 5 is permitted (step S5), and thus, the operator A may perform teaching of the operation program of the robot 2 while operating the teach pendant 5.

In the case where the deadman switch 7 of the teach pendant 5 is in the off state in step S1, whether or not the deadman switch 6 has been switched to the on state by the teaching handle 4 being gripped is determined (step S2). When the deadman switch 6 is switched to the on state, operation of the robot 2 by the teaching handle 4 is permitted (step S6), and thus, the operator A may perform teaching of the operation program of the robot 2 while operating the teaching handle 4.

In the case where the deadman switch 7 of the teach pendant 5 is in the off state in step S1, and the deadman switch 6 of the teaching handle 4 is in the off state in step S2, power from the power supply 10 is shut off by the power shut-off unit 11, and the robot 2 cannot be operated (step S4).

In the case where the deadman switch 7 of the teach pendant 5 is in the on state in step S1, and the deadman switch 6 of the teaching handle 4 is in the on state in step S3, power from the power supply 10 is shut off by the power shut-off unit 11, and the robot 2 cannot be operated (step S4).

As described above, with the robot system 1 according to the present embodiment, the operator A is allowed to perform a teaching operation by selecting one of the teach pendant 5 and the teaching handle 4. Accordingly, in addition to an intuitive teaching operation using the teaching handle 4, teaching of a complex operation program may be performed by using the teach pendant 5.

With the robot system 1 according to the present embodiment, an inconvenience caused by including two operation means of the teach pendant 5 and the teaching handle 4, that is, occurrence of a situation where the robot 2 can be operated at the same time by both operation means, can be reliably prevented.

That is, a teaching operation of the robot 2 can be performed by using, as the operation means, only one of the teach pendant 5 and the teaching handle 4 that is selected by being gripped first by the operator A.

That is, in the case where the teach pendant 5 is gripped first, a teaching operation can be performed only by the teach pendant 5, and a teaching operation cannot be performed using the teaching handle 4. On the other hand, in the case where the teaching handle 4 is gripped first, a teaching operation can be performed only by the teaching handle 4, and a teaching operation cannot be performed using the teach pendant 5.

Moreover, with the robot system 1 according to the present embodiment, if, during a teaching operation by one of the operation means, the deadman switch 6, 7 of the other operation means is also switched to the on state, power is shut off so that operation by either operation means is disabled. As a result, an advantage may be obtained that occurrence of a situation where the robot 2 can be operated at the same time by both the operation means can be more reliably prevented.

Figure 4:
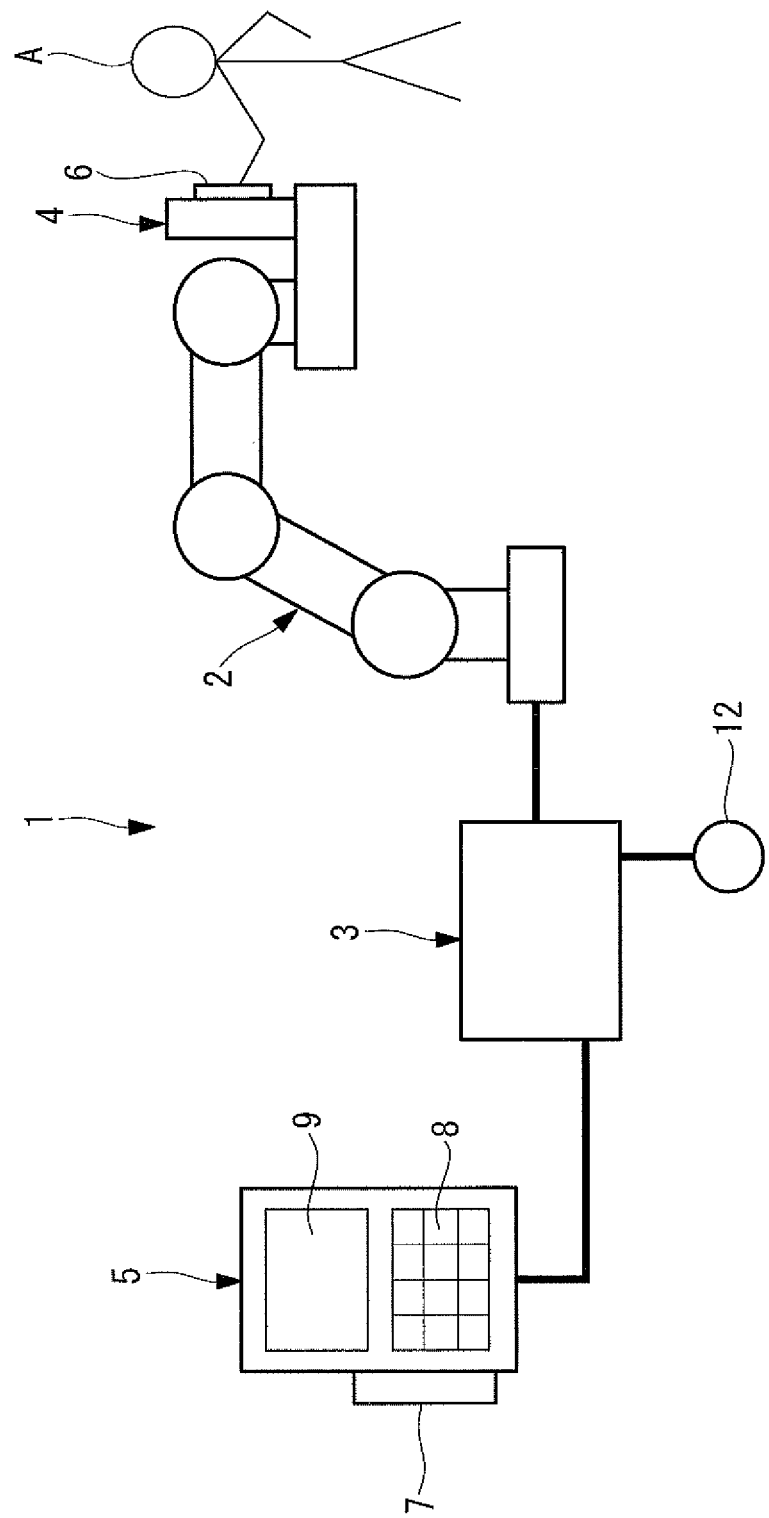
FIG. 4 is an overall configuration diagram showing a first modification of the robot system in FIG. 1.

Additionally, in the present embodiment, the operator A determines the operation means which is to be permitted to operate the robot 2, by gripping one of the teach pendant 5 and the teaching handle 4, but instead, a changeover switch (selector switch) 12 may be provided at the control device 3, as shown in FIG. 4, and which of the teach pendant 5 and the teaching handle 4 is to be used may be determined by operating the changeover switch 12.

In this case, for example, if the teach pendant 5 is selected in advance by the changeover switch 12, operation of the robot 2 by the teaching handle 4 is not permitted even if the deadman switch 6 of the teaching handle 4 is switched to the on state first, and the robot 2 can be operated only by the teach pendant 5, and vice versa.

Figure 5:
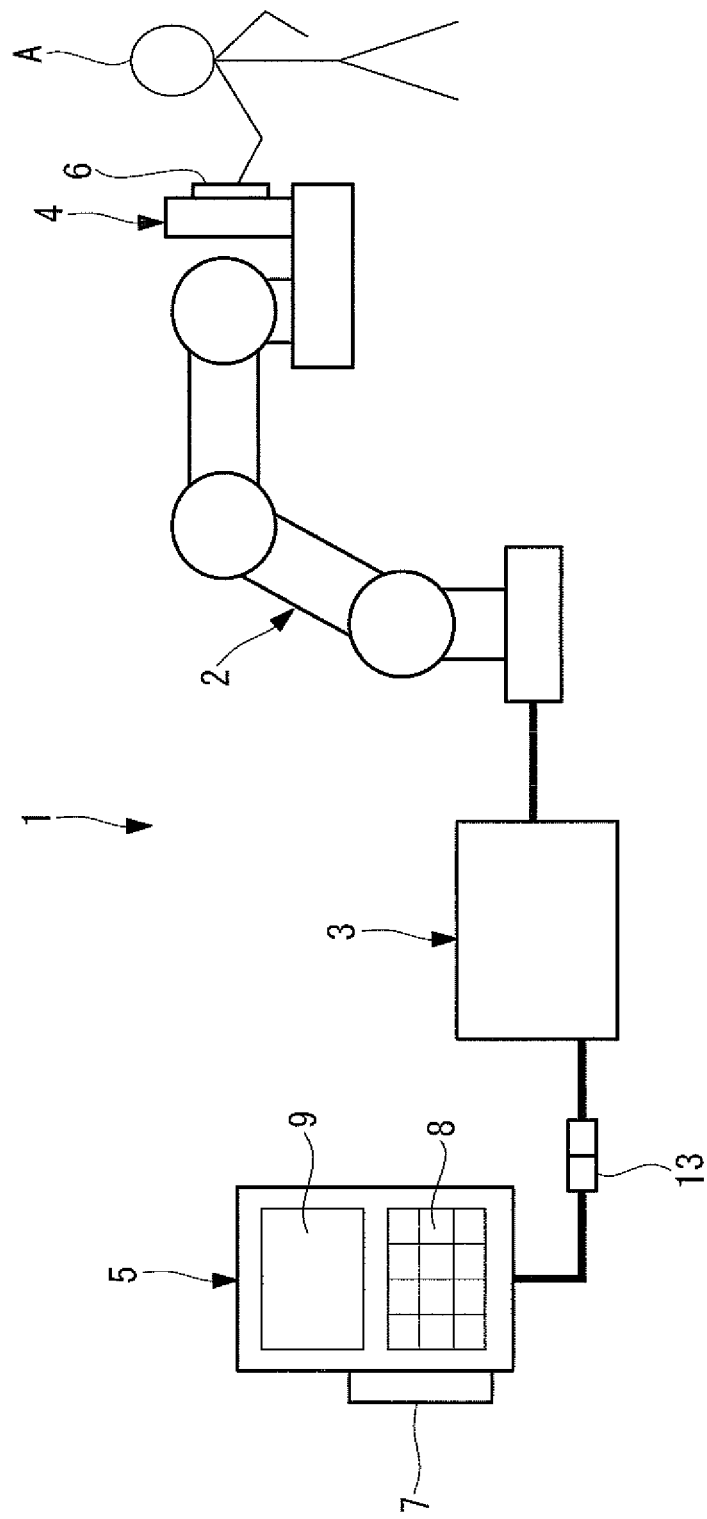
FIG. 5 is an overall configuration diagram showing a second modification of the robot system in FIG. 1.

Alternatively, as shown in FIG. 5, the teach pendant 5 may be detachably attached to the control device 3 by a connector 13, and a sensor, not shown, for detecting an attachment state of the teach pendant 5 may be provided.

In the case where the teach pendant 5 is detected by the sensor to have been attached to the control device 3, operation of the robot 2 is permitted only to the teach pendant 5, and operation of the robot 2 by the teaching handle 4 is not permitted even if the deadman switch 6 of the teaching handle 4 is switched to the on state.

On the other hand, in the case where the teach pendant 5 is detected by the sensor to have been removed from the control device 3, operation of the robot 2 is permitted only to the teaching handle 4.

From the above-described embodiment, the following invention is derived.

An aspect of the present invention provides robot system including a robot, a control device configured to control the robot according to an operation program, a portable teach pendant configured to be connected to the control device, and to perform a teaching operation regarding the operation program, and a teaching handle configured to be attached to the robot, to be connected to the control device, and to perform lead-through teaching, where the teach pendant is provided with a first enable switch configured to be switched to an on state in a state where the teach pendant is gripped, and to permit operation of the robot by manual operation of the teach pendant, the teaching handle is provided with a second enable switch configured to be switched to an on state in a state where the teaching handle is gripped, and to permit operation of the robot by the teaching handle, and the control device enables operation of the robot by the teaching handle only when the first enable switch is in an off state and the second enable switch is switched to the on state, and enables operation of the robot by the teach pendant only when the second enable switch is in an off state and the first enable switch is switched to the on state.

According to the present aspect, when both the first enable switch and the second enable switch are in the off state, and the first enable switch is switched to the on state by the teach pendant being gripped by an operator, operation of the robot by manual operation of the teach pendant is permitted, and the operator is enabled to perform a teaching operation regarding the operation program while manually operating the teach pendant to operate the robot. In the same manner, when both the first enable switch and the second enable switch are in the off state, and the second enable switch is switched to the on state by the teaching handle being gripped by the operator, operation of the robot by the teaching handle is permitted, and the operator is enabled to perform a teaching operation regarding the operation program while operating the robot by a force applied to the teaching handle.

Accordingly, in a state where the operator is performing a teaching operation using the teach pendant, operation of the robot by the teaching handle is not permitted even if the teaching handle is gripped and the second enable switch is switched to the on state. Furthermore, in a state where the operator is performing a teaching operation using the teaching handle, operation of the robot by the teach pendant is not permitted even if the teach pendant is gripped and the first enable switch is switched to the on state.

That is, according to the present aspect, an operation program can be intuitively taught by performing lead-through teaching by using the teaching handle, and also, a complex operation program can be easily taught by using the teach pendant. In this case, operation of the robot is permitted only to the teaching handle or the teach pendant, and thus, the robot may be prevented from being operated at the same time by both the teaching handle and the teach pendant.

In the aspect described above, the control device may include a selector switch configured to select either operation by the teach pendant or operation by the teaching handle, and may enable operation of the robot by the teach pendant when the first enable switch is switched to the on state in a state where the teach pendant is selected by the selector switch, and may enable operation of the robot by the teaching handle when the second enable switch is switched to the on state in a state where the teaching handle is selected by the selector switch.

Accordingly, the robot may be operated by the teach pendant by switching the first enable switch to the on state by gripping of the teach pendant, only when the teach pendant is selected by the operator by the selector switch, and the robot may be operated by the teaching handle by switching the second enable switch to the on state by gripping of the teaching handle, only when the teaching handle is selected by the operator by the selector switch.

Moreover, another aspect of the present invention provides a robot system including a robot, a control device configured to control the robot according to an operation program, a portable teach pendant configured to be connected to the control device, and to perform a teaching operation regarding the operation program, and a teaching handle configured to be attached to the robot, to be connected to the control device, and to perform lead-through teaching, where the teach pendant is provided with a first enable switch configured to be switched to an on state in a state where the teach pendant is gripped, and to permit operation of the robot by manual operation of the teach pendant, the teaching handle is provided with a second enable switch configured to be switched to an on state in a state where the teaching handle is gripped, and to permit operation of the robot by the teaching handle, the teach pendant is detachably provided at the control device, and the control device includes a sensor configured to detect an attachment state of the teach pendant to the control device, and enables operation of the robot only by the teach pendant when the first enable switch is switched to the on state in a state where the teach pendant is determined by the sensor as attached, and enables operation of the robot only by the teaching handle when the second enable switch is switched to the on state in a state where the teach pendant is determined by the sensor as removed.

Accordingly, in the case where the sensor detects that the teach pendant is not attached to the control device, the operator grips the teaching handle and switches the second enable switch to the on state, and the robot can thereby be operated only by the teaching handle. On the other hand, in the case where the sensor detects that the teach pendant is attached to the control device, the operator grips the teach pendant and switches the first enable switch to the on state, and the robot can thereby be operated only by the teach pendant.

Furthermore, in the aspect described above, the control device may shut off power to the robot at a time point of both the first enable switch and the second enable switch being switched to the on state.

Accordingly, in a state where the operator is operating the robot using the teaching handle by gripping the teaching handle and switching the second enable switch to the on state, power to the robot is shut off at a time point of another operator or the like gripping the teach pendant and switching the first enable switch to the on state, and the robot is brought to an emergency stop, and vice versa. The robot is thus prevented from being operated by one of the teach pendant and the teaching handle while the robot is being operated by the other of the teach pendant and the teaching handle.

REFERENCE SIGNS LIST 1 robot system
2 robot
3 control device
4 teaching handle
5 teach pendant
6 deadman switch (second enable switch)
7 deadman switch (first enable switch)
12 changeover switch (selector switch)

The invention claimed is:

1. A robot system comprising:
 a robot;
 a control device configured to control the robot according to an operation program;
 a portable teach pendant configured to be connected to the control device, and to perform a teaching operation regarding the operation program; and
 a teaching handle configured to be attached to the robot, to be connected to the control device, and to perform lead-through teaching, wherein
 the teach pendant is provided with a first enable switch configured to be switched to an on state in a state where the teach pendant is gripped, and to permit operation of the robot by manual operation of the teach pendant,
 the teaching handle is provided with a second enable switch configured to be switched to an on state in a state where the teaching handle is gripped, and to permit operation of the robot by the teaching handle,
 the control device enables operation of the robot by the teaching handle only when the first enable switch is in an off state and the second enable switch is switched to the on state, and enables operation of the robot by the teach pendant only when the second enable switch is in an off state and the first enable switch is switched to the on state, and
 the control device shuts off power to the robot at a time point of both the first enable switch and the second enable switch being switched to the on state.

2. The robot system according to claim 1, wherein the control device includes a selector switch configured to select either operation by the teach pendant or operation by the teaching handle, and enables operation of the robot by the teach pendant when the first enable switch is switched to the on state in a state where the teach pendant is selected by the selector switch, and enables operation of the robot by the teaching handle when the second enable switch is switched to the on state in a state where the teaching handle is selected by the selector switch.

3. A robot system comprising:
 a robot;
 a control device configured to control the robot according to an operation program;
 a portable teach pendant configured to be connected to the control device, and to perform a teaching operation regarding the operation program; and
 a teaching handle configured to be attached to the robot, to be connected to the control device, and to perform lead-through teaching, wherein
 the teach pendant is provided with a first enable switch configured to be switched to an on state in a state where the teach pendant is gripped, and to permit operation of the robot by manual operation of the teach pendant,
 the teaching handle is provided with a second enable switch configured to be switched to an on state in a state where the teaching handle is gripped, and to permit operation of the robot by the teaching handle,
 the teach pendant is detachably provided at the control device, and
 the control device includes a sensor configured to detect an attachment state of the teach pendant to the control device, and enables operation of the robot only by the teach pendant when the first enable switch is switched to the on state in a state where the teach pendant is determined by the sensor as attached, and enables operation of the robot only by the teaching handle when the second enable switch is switched to the on state in a state where the teach pendant is determined by the sensor as removed.

* * * * *